United States Patent [19]

Crean

[11] 4,321,628
[45] Mar. 23, 1982

[54] SCANNING APPARATUS

[75] Inventor: Peter A. Crean, Penfield, N.Y.

[73] Assignee: Xerox Corporation, Stamford, Conn.

[21] Appl. No.: 136,634

[22] Filed: Apr. 2, 1980

[51] Int. Cl.³ ............................................. H04N 1/10
[52] U.S. Cl. .................................. 358/293; 358/285; 358/206
[58] Field of Search ............... 389/293, 285, 199, 206; 250/566, 216; 355/15, 18

[56] References Cited

U.S. PATENT DOCUMENTS

| | | | |
|---|---|---|---|
| 3,241,438 | 3/1966 | Frank | 355/15 |
| 3,655,284 | 4/1972 | Agliata | 355/18 |
| 3,886,309 | 5/1975 | Mason | 358/293 |
| 3,898,627 | 8/1975 | Hooker et al. | 364/400 |
| 4,114,037 | 9/1978 | Westwood | 250/216 |
| 4,135,815 | 1/1979 | Masunaga | 356/4 |
| 4,149,090 | 4/1979 | Agulnek | 358/285 |
| 4,168,900 | 9/1979 | Adachi | 350/1 |

OTHER PUBLICATIONS

W. S. Smith, "The Telecentric Stop" *Modern Optical Engr.*, McGraw-Hill, p. 131.
Nippon Sheet Glass Co. "Selfoc Linear Lens Array", 6-13-78.

*Primary Examiner*—Robert L. Richardson
*Assistant Examiner*—Edward L. Coles
*Attorney, Agent, or Firm*—Frederick E. McMullen

[57] ABSTRACT

An arrangement for optically reducing range finder effect in scanning systems employing plural image scanning arrays or a flying spot scanning beam. In the former, to reduce visually observable artifacts at the point where crossover is made from one adjoining array to the next due to misalignments of the scanning system components, field lenses are disposed between the system projection lenses and the document supporting platen. The field lenses serve to bend the imaging rays to a direction more nearly normal to the platen to thereby increase the depth of focus. Where the scanning system comprises a flying spot beam, a spherical mirror is disposed in the optical path to direct the imaging ray along an axis more nearly normal to the platen.

8 Claims, 5 Drawing Figures

SCANNING APPARATUS

The invention relates to a raster image scanner and, more particularly, to a raster image scanner with increased depth of field.

In array type raster scanning systems, the number of viewing elements in present day scanning arrays such as charge coupled devices (CCD's), is limited. As a result, scanning an entire line of a document original with a single array may not provide the degree of image resolution desired. To offset this, multiple arrays are often used. To assure that the entire line is scanned and that no part of the line is skipped, the arrays are arranged so that the respective array viewing fields overlap. When the image data, i.e. pixels are read out from the arrays, crossover is made from one array to the next within the overlapped area.

However, if the crossover points are not matched leaving either a gap or overlap between arrays, there may result a visually discernable defect or artifact on any copies produced from the image pixels. For this reason, gaps or overlaps at the array crossover point or points are wherever possible avoided altogether, or at least held below a level which could be discerned visually on the copy or copies produced.

In conventional scanning systems, the image rays strike the document viewing station or platen at a relatively large angle with the result that the system's depth of focus is relatively small. As a consequence, any failure to accurately focus the arrays onto the object plane or to maintain focus during system use may result in a gap or overlap at the crossover point or points with attendant degradation of any copies. And, notwithstanding accurate focusing of the arrays, a gap or overlap may nevertheless occur should the plane of the document original being scanned not be co-linear with the object plane at all times.

Scanning systems of the flying spot type may similarly be affected where accurate focus is not obtained or, as in the case where the document original being scanned is not co-linear with the object plane, not maintained.

This invention relates to a raster image scanner, comprising in combination: scanning means for scanning across a document original line by line along a first scan axis; means for establishing relative movement between the scanning means and the document original along a second scan axis substantially perpendicular to the first scan axis; at least one projection lens for focusing imaging rays on the document original; and optical means for bending the imaging rays so that the imaging rays are substantially normal to the plane of the document original whereby to increase the depth of focus of the scanning means, the optical means being disposed between the projection lens and the document original.

Other objects and advantages will be apparent in the ensuing description and drawings in which.

Figure 1:
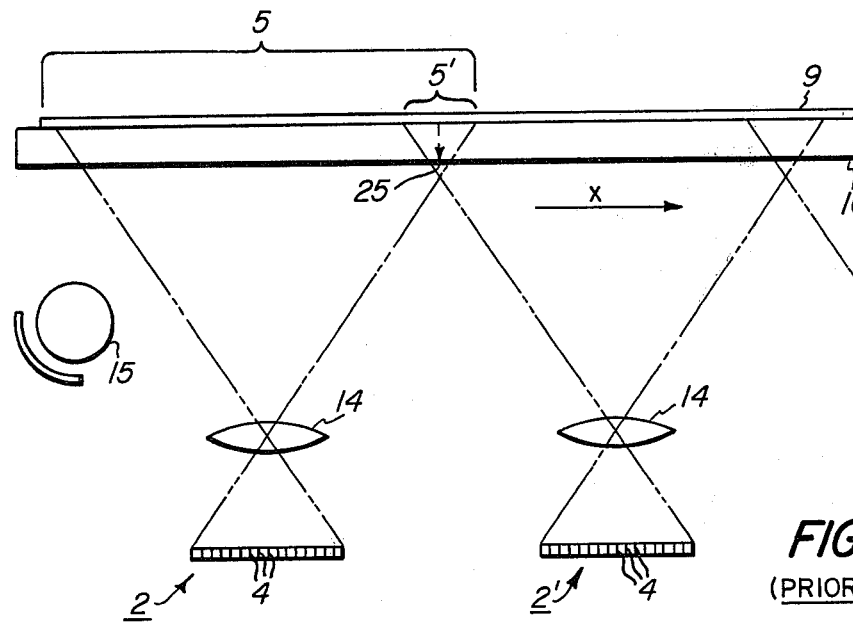
FIG. 1 is a schematic view of a prior art multiple array scanning system illustrating Range Finder effect.

Referring to FIG. 1, several linear arrays 2 of photosensor elements are arranged in side by side fashion along one scan axis (i.e. the X axis), the arrays cooperating to scan one line at a time of a document original 9 disposed on a transparent viewing station or platen 10 thereabove. The exemplary arrays 2 each comprise a plurality of individual photosensitive picture elements 4 disposed in succession along the array longitudinal axis corresponding herein to scan axis X.

Photosensitive elements 4 of arrays 2 are normally silicon with carrier detection by means of phototransistors, photodiode-MOS amplifiers, or CCD detection circuits. One suitable array is the Fairchild CCD, Model 121, 1728 pixel 2-phase linear array manufactured by Fairchild Corporation.

Inasmuch as the number of photosensitive elements 4 in a single array, for example, the 1728 elements of the aforementioned Fairchild CCD type array, may not be sufficient to provide the needed image resolution, plural arrays 2 are used. To guard against loss of image data or interruption of the scan line while avoiding the problems associated with optically abutting the adjoining ends of the array viewing fields 5, arrays 2 are supported so that the array viewing fields 5 overlap at 5'. On readout of the image data, referred to as pixels herein, crossover is made from one array to the next succeeding array within the crossover area 5', i.e. at point 25. One exemplary crossover arrangement may be found in U.S. Pat. No. 4,149,090, issued Apr. 10, 1979 to Martin A. Agulnek and incorporated by reference herein.

To focus the image onto the arrays 2, a projection lens 14 is provided for each array. One or more lamps 15 are provided for illuminating platen 10 and the document original 9 thereon.

Arrays 2, lenses 14, and lamps 15 may be suitably supported in predetermined spaced relationship on a movable scan carriage (not shown) disposed below platen 10. The scan carriage is arranged for back and forth scanning movement (in the Y-direction) of the platen 10 and the document original 9 thereon, there being suitable driving means (not shown) provided for this purpose, as may be readily envisioned by one skilled in the art. One exemplary arrangement may be found in the aforementioned U.S. Pat. No. 4,149,090 to Agulnek.

Alternately, means may be provided to move platen 10 and the document original 9 thereon in a scanning direction, or platen 10 may be stationary and suitable document feeder means provided to move the document original across platen 10 for scanning by arrays 2.

One drawback to the aforedescribed scanning system is the limited depth of field due to Range Finder effect at the point (i.e. point 25) where crossover from one array to the next succeeding array is made. Range-Finder effect may be understood by the optical projection shown in FIG. 2 where the photosensitive elements 4 are projected into object space. As the object plane 16 is moved toward or away from the plane 17 to which the system is focused, the principal rays 20, 20+1 . . . 20N−1, 20N, passing through the lenses 14 move along the object plane 16.

Figure 2:
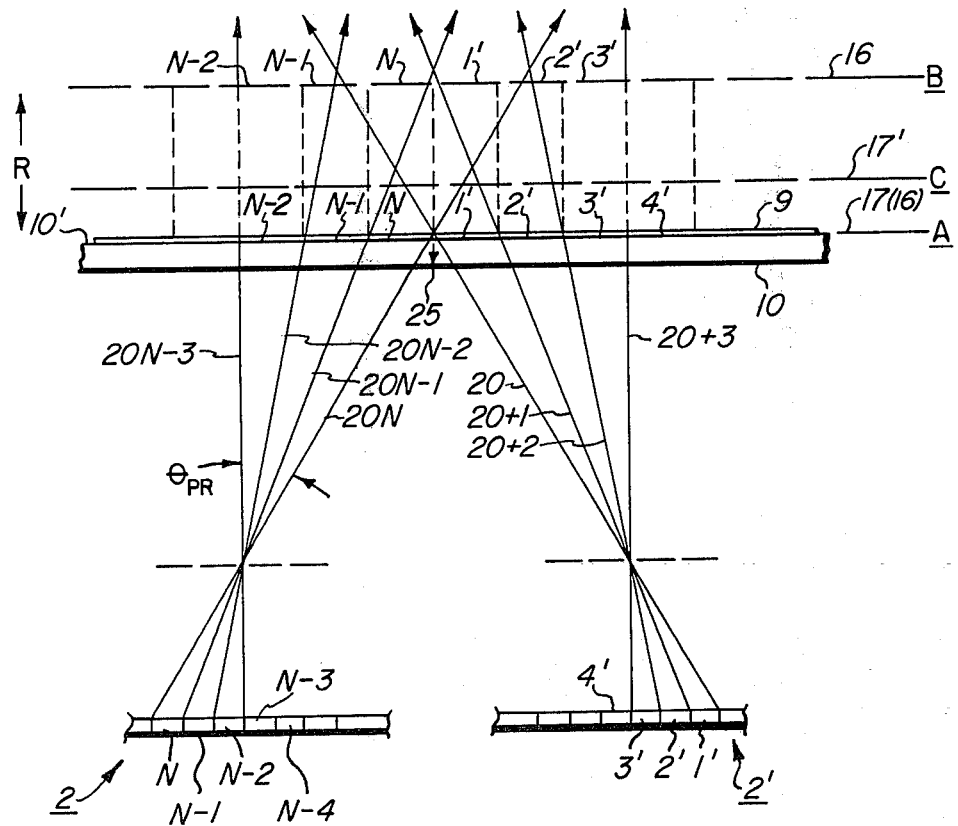
FIG. 2 is an optical schematic illustrating Range Finder effect at the crossover point between adjoining arrays.

In FIG. 2, with the planes 16, 17 coextensive with the upper surface 10' of platen 10 (position A), the principal rays 20N and 20N−1 of array 2 delimit the last image pixel N before the array crossover point 25 while preceding pixels N−1, N−2, etc. scanned by array 2 are delimited by rays 20N−1 and 20N−2; 20N−2 and 20N−3; etc. The principal rays 20 and 20+1 of the next array (identified by numeral 2' herein) delimit the first image pixel 1' after the array crossover point 25 while subsequent pixels 2', 3', etc. are delimited by rays 20+1 and 20+2; 20+2 and 20+3; etc.

As object plane 16 moves away from plane 17, i.e. to position B, the principal rays in effect move toward one another, and in the case of first and last rays 20, 20N, pass one another. In this circumstance, in the example shown, optical overlapping or doubling occurs, the degree of which is dependent upon the amount of movement of object plane 16 relative to plane 17. In the example shown, displacement of object plane 16 is such that rays 20 and 20+1 of array 2' delimit substantially the same pixel (i.e. pixel N) as rays 20N−1 and 20 N−2 of array 2, and rays 20N and 20N−1 of array 2 delimit substantially the same pixel (i.e. pixel 1')as rays 20+1 and 20+2 of array 2'.

Thus, in instances where for one reason or another, the document original 9 is spaced above the upper surface 10' of platen 10 (presuming platen surface 10' and the focusing plane 17 coincide), image doubling may occur, the degree of which is dependent upon the distance between the document original and plane 17. Spacing of the document original 9 from the platen surface may occur, for example where the document original is comprised of document materials pasted together, resulting in multiple document layers which act to space some or all of the original document from the platen upper surface 10', or in the case of a document feeder which permits the document originals to float above the surface of platen 10, etc.

Quantitatively, Range Finder effect may be expressed by the equation:

$$R = 1/(2S_D \tan \theta_{pr})$$

where:
R = available depth of field for one pixel of crossover;
$S_D$ = pixel spacing on the document original; and
$\theta_{pr}$ = the principal ray angle.

Evaluation of copies made by scanners of the type heretofore described indicates that doubling of one pixel at crossover (i.e. pixels N, 1') is not normally detectable by the eye. However, where two or more pixels are doubled (i.e. pixels N and 1'; N−1 and 2') the resulting artifact may be seen by the naked eye.

Since Range Finder effect takes place on motion of object plane 16 both toward and away from the focusing plane 17, plane 17' may, for example, be established at a point above surface 10' of platen 10 (i.e. at position C) which produces a loss or gap of approximately ½ pixel at the crossover point while permitting a doubling of up to 1½ pixels for a total range of 2 pixels which is within the range where visual detection would normally not occur.

Reducing the principal ray angle $\theta_{pr}$ increases the depth of field R while maintaining a range of no more than two pixels doubled at the crossover point. For example, presuming a minimum of 30 pixels of overlap between arrays 2, 2', with an angle $\theta_{pr}$ of 3° and pixel spacing $S_D$ of 480 pixels/in, then using the aforementioned formula, the depth of field R is 0.040 in. In comparison, where angle $\theta_{pr}$ is presumed to be 9.78° with pixel spacing of 480 pixels/in, the depth of field R is 0.006".

Due to physical limitations imposed by the system, it has been found that the angle $\theta_{pr}$ cannot be reduced to zero. Instead, a minimum angle, determined to be 3° is required.

Figure 3:
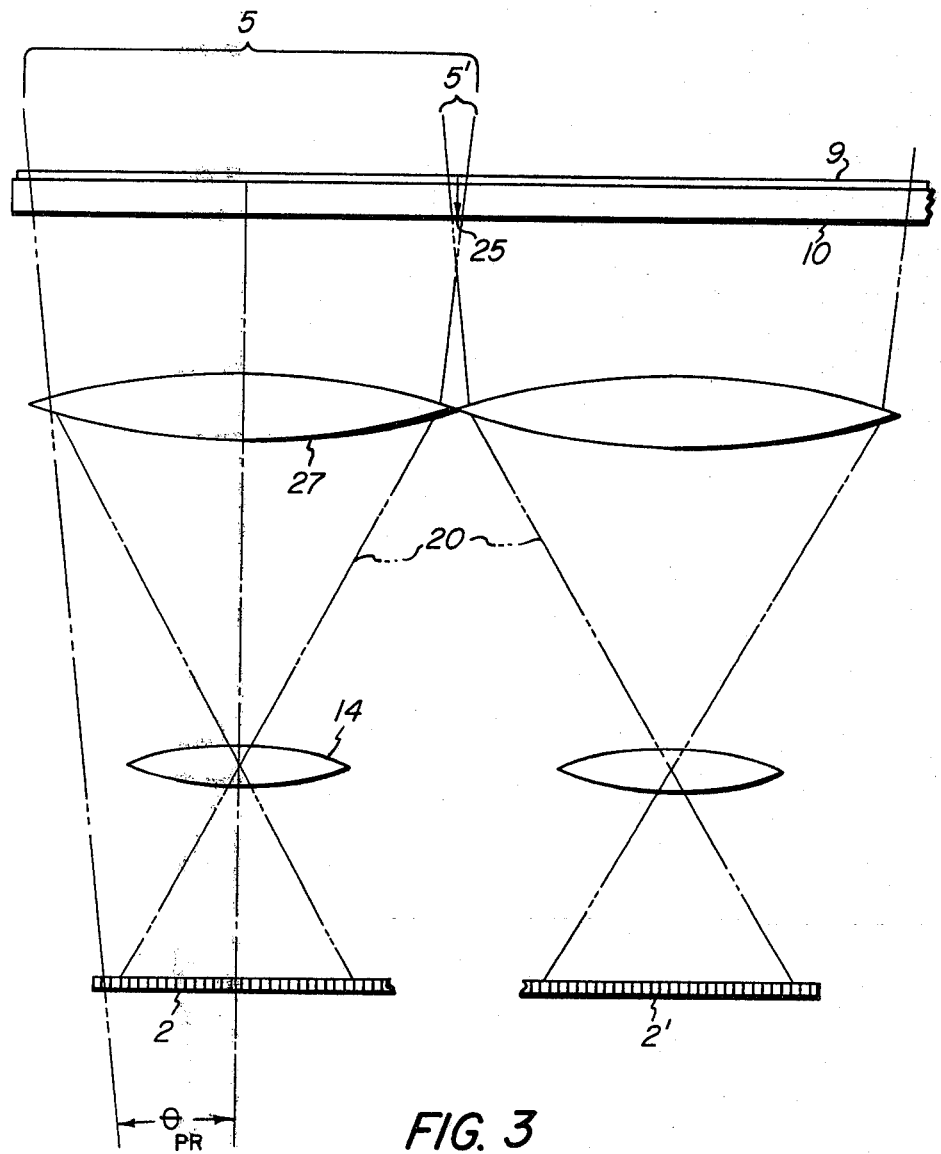
FIG. 3 is a schematic view illustrating the optical system of the present invention in a multiple array scanning system.

Referring now to FIG. 3, where like numerals refer to like parts, a field element lens 27 is disposed in the image path of each array between projection lens 14 and platen 10. Field element lenses 27 serve to turn the image rays 20 in a direction substantially normal to platen 10, thereby making the system approximately telecentric. As described heretofore, the angle $\theta_{pr}$ of the principal image rays 20 to platen 10 is optimumly no smaller than 3° and the optical system including lenses 27 are designed in the preferred embodiment to provide a principal ray angle $\theta_{pr}$ of approximately 3°.

With the image rays substantially normal to platen 10, the depth of field R is increased substantially, as may be seen from the previous mathematical analysis, thereby reducing the criticality heretofore associated with locating and maintaining the system scanning components in exact position relative to platen 10 while accommodating document originals or portions thereof that are not in face to face contact with the surface of platen 10, but are instead, spaced thereabove.

Figure 4:
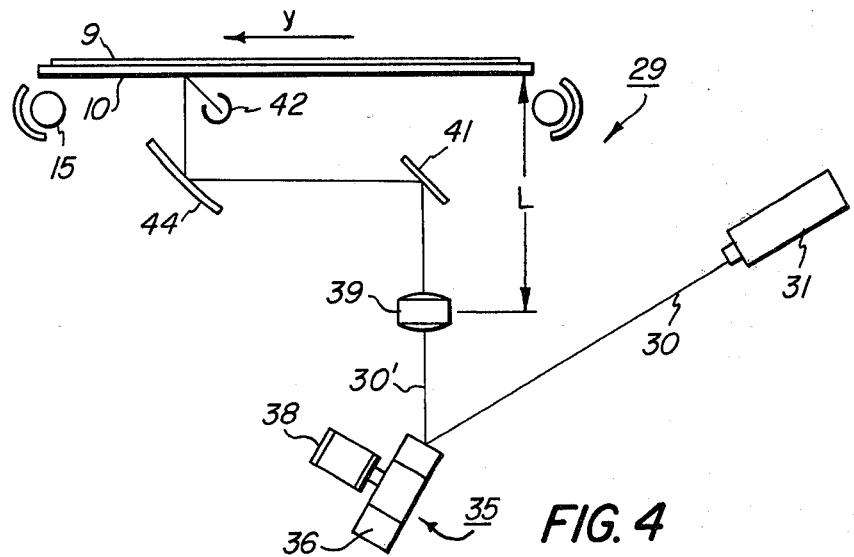
FIG. 4 is a schematic side view illustrating the optical system of the present invention as applied to a flying spot scanning system.
Figure 5:
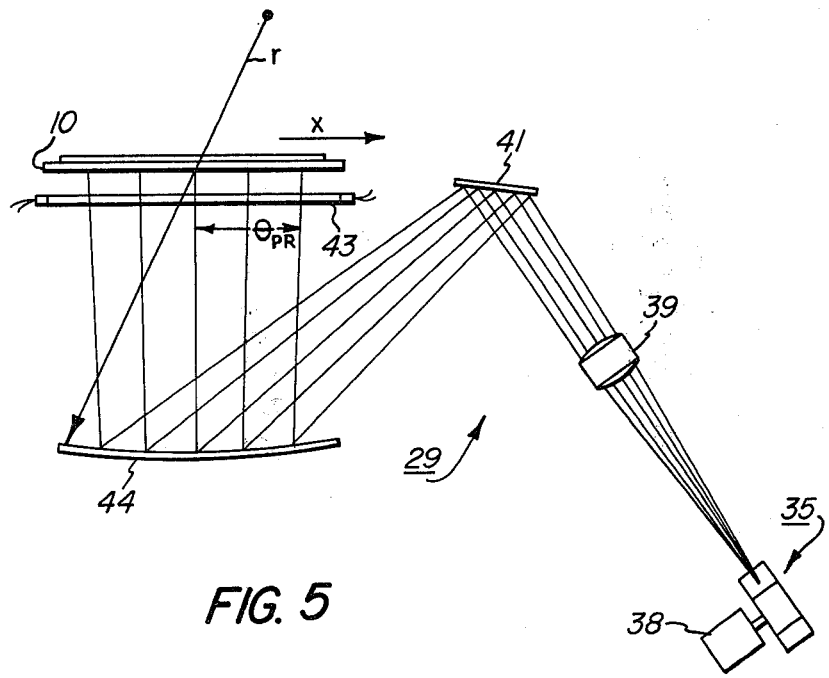
FIG. 5 is a schematic end view of the optical system shown in FIG. 4.

Referring now to the embodiment shown in FIGS. 4 and 5, there is shown the priciples of the present invention applied to a raster scanning system 29. System 29 includes a collated beam 30 of light generated, for example, by a laser 31. The beam is directed to a rotating scanning polygon 35 having mirrored facets 36, polygon 35 sweeping the beam across platen 10 and the document original 9 thereon (in the X direction) one line at a time. The sweep of the beam 30 is transverse to the direction of relative movement of the document original in the Y direction. Polygon 35 is rotated at a constant rate by motor 38.

The beam of the light 30' reflected from facets 36 of polygon 35 is focused to a spot on platen 10 and the document original thereon by projection lens 39. Scattered light from the document is collected by suitable means such as integrating cavity 42, the reflected light being converted to analog image signals by suitable detectors 43. Cooperating mirrors 41, 44 fold the front conjugate and direct the scanning beam to platen 10. Mirror 41 comprises a plane mirror while mirror 44 comprises a spherical segment having a radius r substantially equal to twice the front conjugate L of an uncorrected system. Mirror 44 serves to direct the scanning beam onto platen 10 and the document original thereon at an angle $\theta_{pr}$ substantially perpendicular to the plane of platen 10, thereby making the system approximately telecentric, as described heretofore in connection with the FIG. 3 embodiment. As a result, the depth of focus is substantially increased to render location of the scanning system elements less critical and accommodate instances where the document original or portions thereof is not in face to face contact with platen 10 as described heretofore.

In one system with 16 mm lenses operating at a 4 to 1 object/image ratio, mirror 44 is approximately 3½ inches long with a 20 inch radius. This reduces range finder effect to ten percent which is comparable to the original depth focus of diffraction limited lenses at f5.46.

Alternately, mirrors 41, 44 may be dispensed with and fresnel or signet type lenses may be used instead.

While the invention has been described with reference to the structure disclosed, it is not confined to the details set forth, but is intended to cover such modifications or changes as may come within the scope of the following claims:

I claim:

1. Means for enhancing the depth of focus in a raster image scanner having scanning means for scanning across a document original line by line along a first scan axis, together with means for establishing relative movement between said scanning means and the document original along a second scan axis substantially perpendicular to said first scan axis, the combination of:

at least one projection lens for focusing imaging rays on said document original; and optical means for bending said imaging rays so that said imaging rays are substantially normal to both said first and second scan axes whereby to increase the depth of focus of said scanning means, said optical means being disposed between said projection lens and said document original.

2. Means according to claim 1 in which said scanning means includes plural scanning arrays, each of said arrays having a preset viewing field, said projection lenses being provided for each of said arrays to focus said arrays on said document original so that the viewing fields of adjoining arrays overlap to provide an uninterrupted scan line, said optical means comprising a lens for each of said arrays for turning said imaging rays so that said imaging rays are within 3° of normal.

3. Means for enhancing the depth of focus in a raster input scanner having scanning means for scanning across a document original line by line along a first scan axis, together with means for establishing relative movement between said scanning means and the document original along a second scan axis substantially perpendicular to said first scan axis, the combination of:

at least one projection lens for focusing imaging rays on said document original; and optical means for bending said imaging rays so that said imaging rays are substantially normal to both said first and second scan axes whereby to increase the depth of focus of said scanning means, said optical means being disposed between said projection lens and said document original, said scanning means comprising a flying spot scanner having a scanning beam, said projection lens focusing the imaging rays generated by said beam as said beam scans across said document original to a spot on said document original, said optical means including a spherical mirror surface for turning said imaging rays so that said imaging rays are within 3° of normal.

4. Means for enhancing the depth of focus in a raster scanning system having at least two linear scanning arrays for scanning across a document original on a platen along a first axis, together with means for establishing relative movement between said scanning arrays and said platen along a second axis substantially normal to said first axis, each of said arrays having a preset viewing field, the viewing fields of said arrays overlapping one another to assure uninterrupted scanning by said arrays across said document original, with means to cross over from one array to the next array within said viewing fields when reading out image signals from said arrays, the combination comprising:

at least one projection lens for each of said scanning arrays for focusing said scanning arrays on said platen and the document original thereon; and a field lens associated with each of said projection lenses for bending said image rays so that said image rays are substantially normal to both said first and second axes to thereby increase the depth of focus of said system.

said field lenses being disposed between said projection lenses and said platen.

5. Means according to claim 4 in which said field lenses comprise fresnel type lenses.

6. Means according to claim 4 in which said field lenses comprise signet type lenses.

7. Means according to claim 4 in which the field lenses bend said image rays so that said image rays are within 3° of normal.

8. In a flying spot scanning system for scanning document originals on a platen, said platen laying in a predetermined plane, the combination of:

an imaging lens having an optical axis substantially normal to said plane of said platen; said lens being a preset distance from said platen;

a first substantially planar mirror for turning said image rays substantially 90°; and a second mirror for turning said image rays through a second substantially 90° arc, whereby said image rays are substantially normal to said platen, the second mirror comprising a spherical segment having a radius substantially equal to twice the distance between said platen and said imaging lens.

* * * * *